United States Patent [19]
Weng

[11] Patent Number: 6,000,085
[45] Date of Patent: Dec. 14, 1999

[54] COMPACT DISC CLEANER

[75] Inventor: Jin-Sheng Weng, Taipei, Taiwan

[73] Assignee: Taiwan Bor Ying Corporation, Taipei Hsien, Taiwan

[21] Appl. No.: 09/111,398

[22] Filed: Jul. 7, 1998

[51] Int. Cl.$^6$ .............................. A47L 25/00; B08B 11/02; G11B 3/58
[52] U.S. Cl. ..................... 15/102; 15/97.1; 15/DIG. 14; 369/72
[58] Field of Search .................... 15/97.1, 102, DIG. 14; 369/72

[56] References Cited

U.S. PATENT DOCUMENTS

| | | | |
|---|---|---|---|
| 4,713,856 | 12/1987 | Clausen | 15/97.1 |
| 4,750,231 | 6/1988 | Kogashiwa | 15/97.1 |
| 4,759,093 | 7/1988 | Hood | 15/97.1 |
| 4,783,870 | 11/1988 | Yeung | 15/97.1 |
| 4,825,497 | 5/1989 | Nagao et al. | 15/97.1 |
| 5,537,706 | 7/1996 | Baker | 15/97.1 |
| 5,584,089 | 12/1996 | Huang | 15/97.1 |
| 5,822,822 | 10/1998 | Weng | 15/97.1 |

*Primary Examiner*—Terrence R. Till
*Attorney, Agent, or Firm*—Pro-Techtor International Services

[57] ABSTRACT

The present invention relates to a compact disc cleaner which includes a box base having a cover and a seat, a turntable that is rotated on the cover, a cleaning device moveably attached at the near end of the turntable that includes a knob and a wheel body on the exterior and interior of the turntable, a cleaning element attached underneath the wheel body and gear teeth on the external wall of the wheel body that engage with the gear teeth on the internal wall of the box base. The cover is pivoted, at one end, with the seat in which the compact disc is held. When the user rotates the knob of the cleaning device, the turntable will revolve as the same time and the internal gear of the box base will bring the wheel body on the cleaning device to rotate within the radius of the compact disc so to effectively clean the compact disc with the cleaning element underneath the wheel body.

6 Claims, 2 Drawing Sheets

COMPACT DISC CLEANER

FIELD OF THE INVENTION

The present invention relates to a compact disc cleaning cleaner whose simple mechanism makes it possible to effectively clean compact discs in an easy and convenient way.

DESCRIPTION OF THE PRIOR ART

As a result of the progress in industrial technologies and the promotion of living quality, people are spending more time on recreational activities. Therefore, there's an increasing demand for higher audio and video enjoyment. Audio and video compact discs soon gain general acceptance for their hi-fidelity effects. Now they have become very popular in household, restaurants, audio-video centers, etc.

The compact disc is a high quality technological product. Like all other products, it requires periodic or nonperiodic cleaning and maintenance to keep its qualities and performance as well as prolong its usable life.

With its unique laser grooves, a compact disc should be wiped in a straight line either from center to edge or just the opposite, i.e., the cleaning direction should be kept vertical with the circumference of the disc. If a compact disc is wiped along the circumferential direction, the grooves on its surface will be damaged. This will cause a serious impact to its performance, or even worse, put an end to its usability.

There are great number of compact disc cleaners available which meet the abovementioned cleaning requirements. The present invention, however, provides a different mechanism that can achieve a better cleaning effect.

SUMMARY OF THE INVENTION

The features of the present invention includes a box base having a seat and a cover, on which a turntable is rotated. rotatably attached at the near end of the turntable is a cleaning device which includes a knob and a wheel body located on the exterior and the interior of the turntable. A cleaning element is attached underneath the wheel body. There are gear teeth on the wheel body's external wall which match with the gear teeth inside the box base. At one end, the said cover is pivoted to the seat, within which a compact disc can be held for cleaning. When the user turns the knob on the cleaning device, the turntable will start revolving as well; in the meantime, the gear teeth inside the box base will start the wheel body of the cleaning device so that it will begin to rotate with the radius of the compact disc. In this way, the cleaning element attached to the wheel body can clean the compact disc efficiently.

DETAILED DESCRIPTION OF THE PREFERRED EMBODIMENT

As the drawings indicate, the present invention includes a box base D, a turntable 3 and a cleaning device 4. The box base having a cover 1 and a seat 2.

Figure 1:
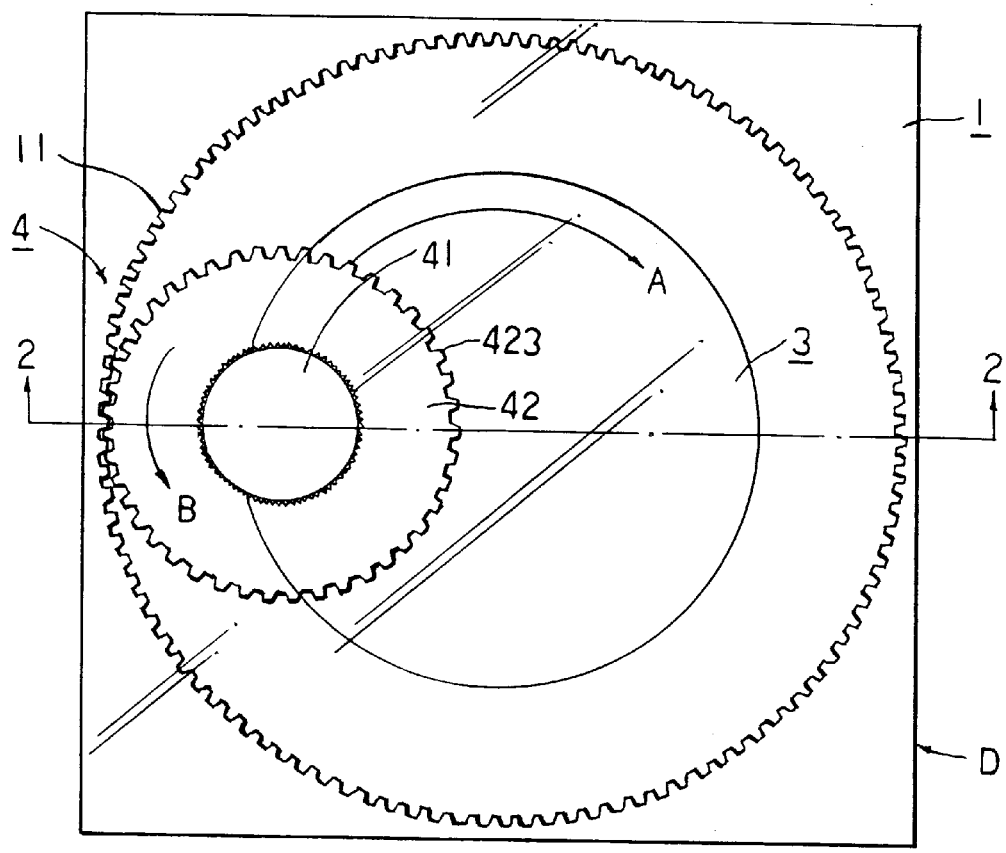
FIG. 1 is the top view of an embodiment of the present invention.
Figure 3:
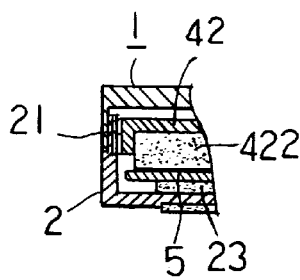
FIG. 3 is a partial sectional view of another embodiment of the present invention.
Figure 2:
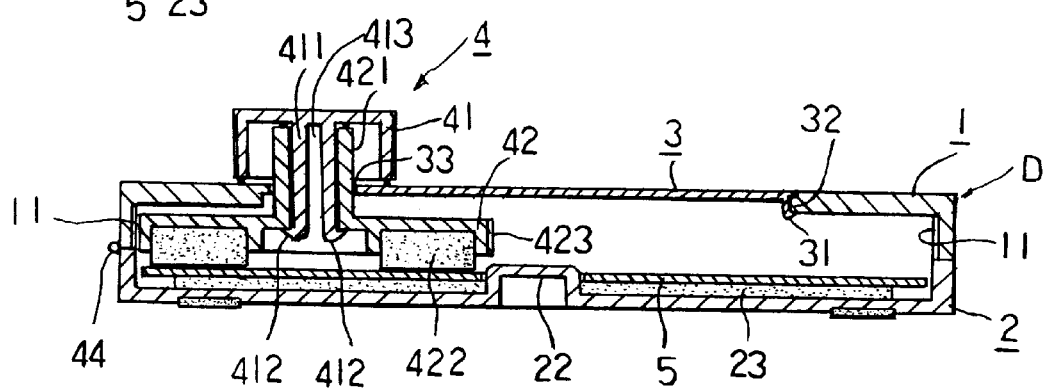
FIG. 2 is a sectional view along line 2—2 of FIG. 1.

The aforementioned cover 1 and seat 2 are pivoted at one end Nia pivot means 44, and thus the cover can be opened and closed. There are teeth on the internal wall of the box base, such as the internal gear 11, circling along the internal wall of the cover, as seen in FIG. 1 and FIG. 2, or the internal teeth 21, circling along the circumference inside the seat, as seen in FIG. 3. At the center inside the seat 2 is a boss 22 surrounded by a soft and unsmooth pad 23 on which a compact disc 5 is held.

The discus-like turntable 3 is rotatably secured to the edge at the matching position on the cover 1. Spaced beneath the outer rim are several hooks 31 which form grooves 32 with the rim of the turntable. The turnable is able to wedge into the edge 12 on the cover 1 with its hooks 31 so that it can be revolved freely.

The cleaning device 4 is rotatably secured at the near end of the turntable 3. It has a knob 41 and a wheel body 42 which are located on the exterior and the interior of the turntable 3. On the turntable there is a hole 33 with opening, and a pipe stem 411 is formed at the center of the knob 41. The pipe stem has a pair of vertical slots 413 and a pair of elastic hooks 412 at the bottom end, whereas the said wheel body 42 has an upward socket 421 at the center position. To assemble the cleaner, first the socket 421 of the wheel body 42 should go through the hole 33 on the turntable 3, and then the pipe stem 411 of the knob 41 should be pivoted into the socket 421 of the wheel body 42 until the hooks 412 and the bottom end of the socket are so hooked that the wheel body is rotatable in the turntable. A cleaning element 422, e.g., deerskin, is attached underneath the wheel body and the gear teeth (external gear) 423 which circle along the circumference of the wheel body will engage with the internal gear 11 (as shown in FIG. 2) or 21 (as shown in FIG. 3).

As indicated in the drawings, the user, while operating the present invention, should turn the knob 31 of the cleaning device 4 to make it revolve round the center of the seat 2 (as indicated by arrow A; the turntable 3 will revolve at the same time). At this moment, the external gear 423 of the cleaning device's wheel body 42 will engage with the box base's D internal gear 11 or 21 and rotate round the pipe stem 411 of the knob 41 (as indicated by arrow B). The cleaning device 4, under the influence of rotation and revolution, is able to clean the entire compact disc 5 effectively in the radial direction with the cleaning element 422 attached.

Figure 4:
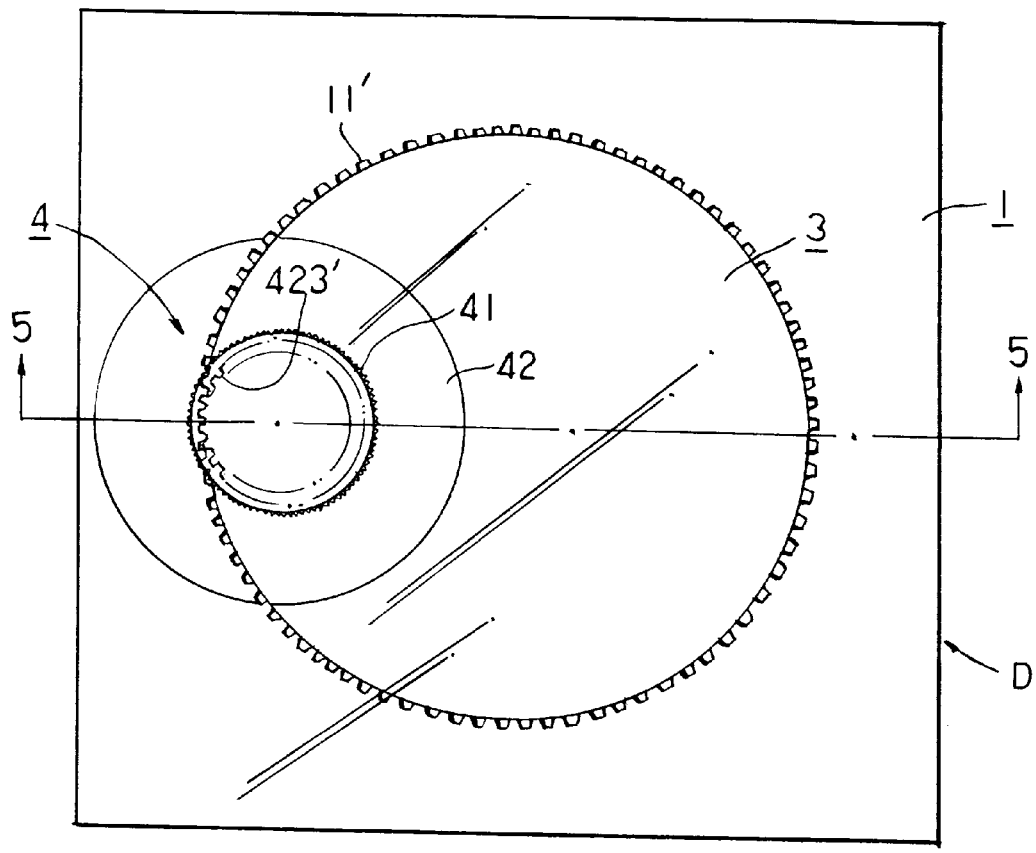
FIG. 4 is the top view of a third embodiment of the present invention.
Figure 5:
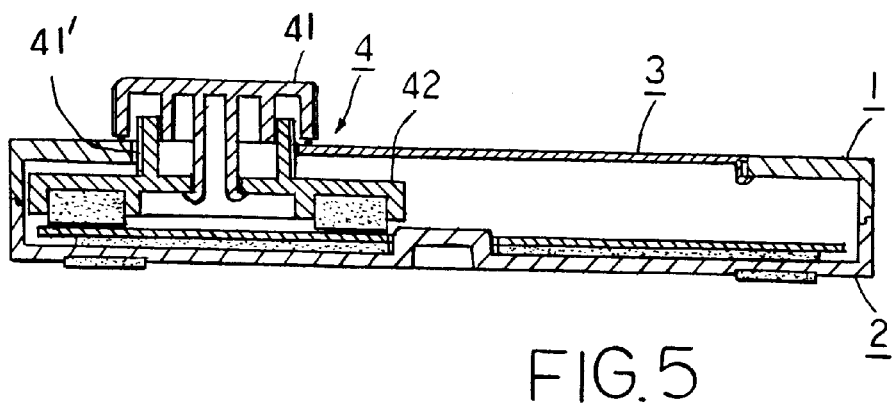
FIG. 5 is a sectional view along line 5—5 of FIG. 4.

As seen in FIG. 4 and FIG. 5, the external gear 423' of the wheel body 42 is located on the external wall of the socket 421 and the internal gear 11' of the box base is on the internal wall of the cover's 1 edge; this will reduce the radius of the wheel body's socket, therefore, the rotating speed of the wheel body will be quicker, which means the cleaning time required can be shortened.

What is claimed is:

1. A compact disc cleaner comprising:

a box base with a cover and a seat, said box base includes a hinge means at one end so that said box base is pivoted for opening and closing, said box base has internal gear teeth and said seat includes means to hold a compact disc inside;

a turntable is rotatable secured to said cover, said turntable includes therein a hole; and a cleaning device is rotatably secured in said hole with a knob on an exterior of said turntable and a wheel body on an interior of said turntable, a cleaning element is attached underneath said wheel body, said wheel body has an external gear that meshes with said internal gear of said box base; such that when a user rotates said knob of said cleaning device, said turntable revolves around a center of said seat, and said external gear of said wheel body of said cleaning device engages said internal gear of said box base so that said wheel body rotates and said cleaning element cleans said compact disc in a radial direction.

2. The compact disc cleaner as claimed in claim 1, wherein:

said internal gear of said box base is located on an internal wall of said cover.

3. The compact disc cleaner as claimed in claim 1, wherein:

said internal gear of said box base is located on an internal wall of said seat.

4. The compact disc cleaner as claimed in claim 1, wherein:

said turntable has a plurality of hooks spaced beneath an outer rim, said turntable includes grooves formed therein so that said turntable engages a bottom rim of an edge of said cover.

5. The compact disc cleaner as claimed in claim 1, wherein:

said cleaning device has a pipe stem formed at a center of said knob, said pipe stem has a pair of vertical slots and a pair of elastic hooks at a lower end thereof, at the center of said wheel body is an upward socket that goes through said hole of said turntable and receives said pipe stem of said knob with said hooks extending through said socket so that said wheel body is rotatably secured in said turntable.

6. The compact disc cleaner as claimed in claim 1, wherein:

said external gear is located on an external wall of said socket of said wheel body and said internal gear of said box base is on an internal wall of said cover.

\* \* \* \* \*